(12) United States Patent
Lee

(10) Patent No.: US 6,633,325 B1
(45) Date of Patent: Oct. 14, 2003

(54) CO-CHANNEL INTERFERENCE CANCELER IN SIMULCAST RECEIVER AND METHOD THEREOF

(75) Inventor: Myeong-hwan Lee, Suwon (KR)

(73) Assignee: Samsung Electronics Co., Ltd., Kyungki (KR)

( * ) Notice: Subject to any disclaimer, the term of this patent is extended or adjusted under 35 U.S.C. 154(b) by 592 days.

(21) Appl. No.: 09/115,996

(22) Filed: Jul. 15, 1998

(30) Foreign Application Priority Data

Aug. 4, 1997 (KR) .............................. 97-37262

(51) Int. Cl.⁷ .............................. H04N 5/216; H04N 5/44
(52) U.S. Cl. .................. 348/21; 348/614; 348/607; 348/725; 348/729; 348/555
(58) Field of Search .......................... 348/21, 17, 614, 348/608, 607, 609, 725, 726, 729, 555, 731, 470, 554, 558; 375/346, 348, 349, 350; H04N 5/44, 5/21, 5/38

(56) References Cited

U.S. PATENT DOCUMENTS

| | | | | |
|---|---|---|---|---|
| 5,040,063 A | * | 8/1991 | Citta et al. ................... 358/141 |
| 5,086,340 A | * | 2/1992 | Citta et al. ................... 358/141 |
| 5,087,975 A | * | 2/1992 | Citta et al. ................... 358/183 |
| 5,170,260 A | * | 12/1992 | Tabata ........................ 358/167 |
| 5,325,188 A | * | 6/1994 | Scarpa ........................ 348/624 |
| 5,389,977 A | * | 2/1995 | Lee ............................ 348/614 |
| 5,452,015 A | * | 9/1995 | Hulyalkar .................... 348/608 |
| 5,512,957 A | * | 4/1996 | Hulyalkar .................... 348/607 |
| 5,546,132 A | * | 8/1996 | Kim et al. .................... 348/607 |
| 5,594,496 A | * | 1/1997 | Nielsen et al. ................. 348/21 |
| 5,602,583 A | * | 2/1997 | Citta ............................ 348/21 |
| 5,745,187 A | * | 4/1998 | Hulyalkar et al. ........... 348/607 |
| 5,801,759 A | * | 9/1998 | Limberg ...................... 348/21 |
| 5,821,988 A | * | 10/1998 | Citta et al. .................... 348/21 |
| 5,995,135 A | * | 11/1999 | Limberg ...................... 348/21 |
| 6,005,640 A | * | 12/1999 | Strolle et al. ................. 348/726 |
| 6,061,096 A | * | 5/2000 | Limberg ...................... 348/555 |

* cited by examiner

*Primary Examiner*—John Miller
*Assistant Examiner*—Jean W. Désir
(74) *Attorney, Agent, or Firm*—Sughrue Mion, PLLC

(57) ABSTRACT

A device for canceling co-channel interference and a method thereof are provided. The device, in a simulcast receiver for receiving a high definition television (HDTV) signal having a digital format and an analog broadcasting TV signal, includes a detector for detecting a synchronous signal from the analog broadcasting TV signal and outputting a detection signal, a co-channel interference rejection filter for removing co-channel interference from a first input signal including co-channel interference and outputting a second input signal, and a selector for selecting either the first or second input signal according to the detection signal. Therefore, the presence or absence of co-channel interference can be accurately determined regardless of channel environment.

11 Claims, 3 Drawing Sheets

CO-CHANNEL INTERFERENCE CANCELER IN SIMULCAST RECEIVER AND METHOD THEREOF

BACKGROUND OF THE INVENTION

1. Field of the Invention

The present invention relates to a receiver, and more particularly, to a reliable co-channel interference canceler in a simulcast receiver and a method thereof.

2. Description of Related Art

In the United States, tests have been completed of a GA-ATV (Grand Alliance Advanced Television) system, which is a digital television transmission system standard which can replace the NTSC (National Television System Committee) standard. A GA-ATV (also called GA-HDTV or GA-VSB) receiver is standardized by the ATSC (Advanced Television System Committee) and adopts a VSB (vestigial side band) modulation method of digital transmission.

A new ATV signal is transmitted simultaneously with a conventional analog television signal (NTSC) via a TV channel which is currently not used in a given geographic region (also called is a "taboo" channel). Accordingly, the GA-ATV receiver must be designed to be robust against NTSC co-channel interference. The configuration of such a GA-ATV receiver is shown in FIG. 1, which is disclosed in U.S. Pat. No. 5,594,496, thus a detailed description of its operation will be omitted.

An NTSC interference rejection filter (hereinafter, called an NRF) selection controller 108 shown in FIG. 1 can be comprised of a field combfilter, a combfilter and a comparator which are shown in the above-described patent specification. The controller 108 can have a configuration disclosed in the following document [1]: [1] "Guide to the Use of the Digital Television Standard for HDTV Transmission," pp.104–107, Doc.A/54, submitted to the United States Advanced Television System Committee, Apr. 12, 1995. Also, other configuration examples can exist.

Here, when a combfilter proposed by the aforementioned patent and an ATSC standard is adopted as an NRF 106, performance of removing NTSC interference is excellent. However, since the combfilter operates by subtracting two full gain signals, the power of additive white gaussian noise (AWGN) is increased by 3 dB. Also, when an 8-level input signal passes through the combfilter, the number of its output levels is increased to 15. Thus, a 3 dB SNR (signal-to-noise ratio) loss is incurred in the combfilter.

Meanwhile, the NRF selection controller 108 generates a selection signal for selecting a path having the smaller error among a non-NRF path and a path having passed through the NRF 106, and applies the selection signal to a selector 110, an adaptive equalizer 112, a phase tracker 114 and a trellis decoder 116. The selector 110 selects a signal (15-level) having passed through the NRF 106 or a signal (8-level) output by a block 104 without passing through the NRF 106, according to the selection signal. The adaptive equalizer 112, the phase tracker 114 and the trellis decoder 116 perform signal processing which is suitable for the state of the selected signal.

In the receiver shown in FIG. 1, selection of the NRF 106 by the NRF selection controller 108 is made prior to the adaptive equalizer 112, the phase tracker 114 and the trellis decoder 116, which means that the signal input to the NRF selection controller 108 includes not only co-channel interference but also AWGN, ghosting and phase noise. In order to solve this problem, in the aforementioned patent, a field combfilter filters a received signal including a field sync of sequential fields, to thus generate a subtracted signal in which static ghosting, DC offset and intersymbol interference have been removed. The NRF is selected according to the result of comparison of a combfiltered subtraction signal with a non-combfiltered subtraction signal, thereby removing the NTSC co-channel interference and other interference.

However, even in the above patent, moving ghosting and phase noise are not removed, which results in unreliable control of the NRF selection.

Meanwhile, as another existing co-channel interference canceler, a detector for detecting the NTSC co-channel interference over the entire section of received data without using a data field sync reference pattern is disclosed in U.S. Pat. No. 5,546,132. An NTSC interference rejection filter having a switched tomlinson precoder for reducing the NTSC co-channel interference in ATV receivers is disclosed in U.S. Pat. No. 5,602,583. A device for removing the NTSC signal interference using digital recursive notch filters is disclosed in the U.S. Pat. No. 5,325,188.

However, when HDTV broadcasting begins, it is inevitable that the NTSC and HDTV broadcasting formats will be in use simultaneously, and therefore a receiver must be capable of reproducing either format. That is, depending on geographic location, a particular TV channel may be broadcast in either NTSC or HDTV format, so a structure whereby either of the two formats can be watched is required. A receiver having the aforementioned structure is called a simulcast receiver.

Therefore, the simulcast receiver must reliably detect and remove the co-channel interference during reception of an HDTV signal.

SUMMARY OF THE INVENTION

It is an object of the present invention to provide a co-channel interference canceler which detects an existing analog broadcasting signal to determine whether co-channel interference exists, in a simulcast receiver.

It is another object of the present invention to provide a method of driving the co-channel interference canceler by detecting the existing analog broadcasting signal.

To accomplish the first object, there is provided a co-channel interference canceler in a simulcast receiver for receiving a high definition television (HDTV) signal having a digital format and an analog broadcasting TV signal, comprising: a detector for detecting a synchronous signal from the analog broadcasting TV signal and outputting a detection signal; a co-channel interference rejection filter for removing co-channel interference from a first input signal including co-channel interference and outputting a second input signal; and a selector for selecting either the first or second input signal according to the detection signal. Also, the detector of the present invention detects a reference signal from the analog broadcasting TV signal and outputs a detection signal.

To accomplish the second object, there is provided a method of removing co-channel interference for use in a simulcast receiver for receiving a high definition television (HDTV) signal having a digital format and an analog broadcasting TV signal, comprising the steps of: (a) detecting a synchronous signal from the analog broadcasting TV signal and outputting a detection signal; (b) canceling co-channel interference from a first input signal including co-channel interference and other interference and outputting a second input signal; and (c) selecting either the first or second input signal according to the detection signal. Also, in the step of outputting a detection -signal according to the present invention, a reference signal is detected from the analog broadcasting TV signal, and the detection signal is then output.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
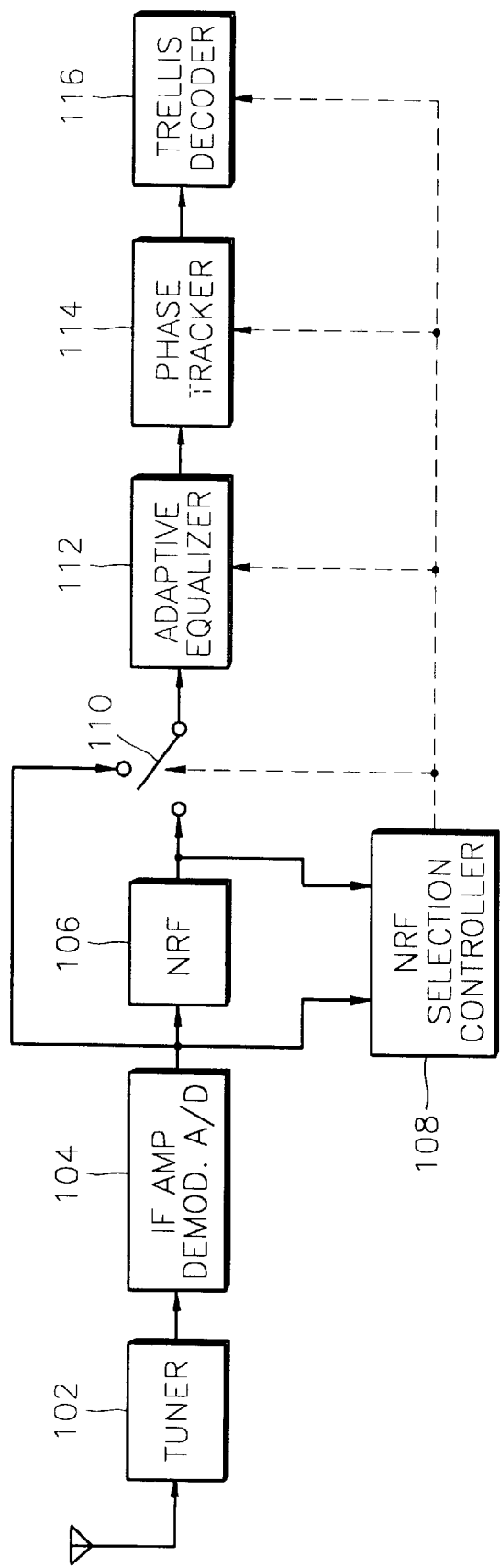
FIG. 1 is a block diagram of a high definition television (HDTV) receiver including a conventional co-channel interference canceler.
Figure 2:
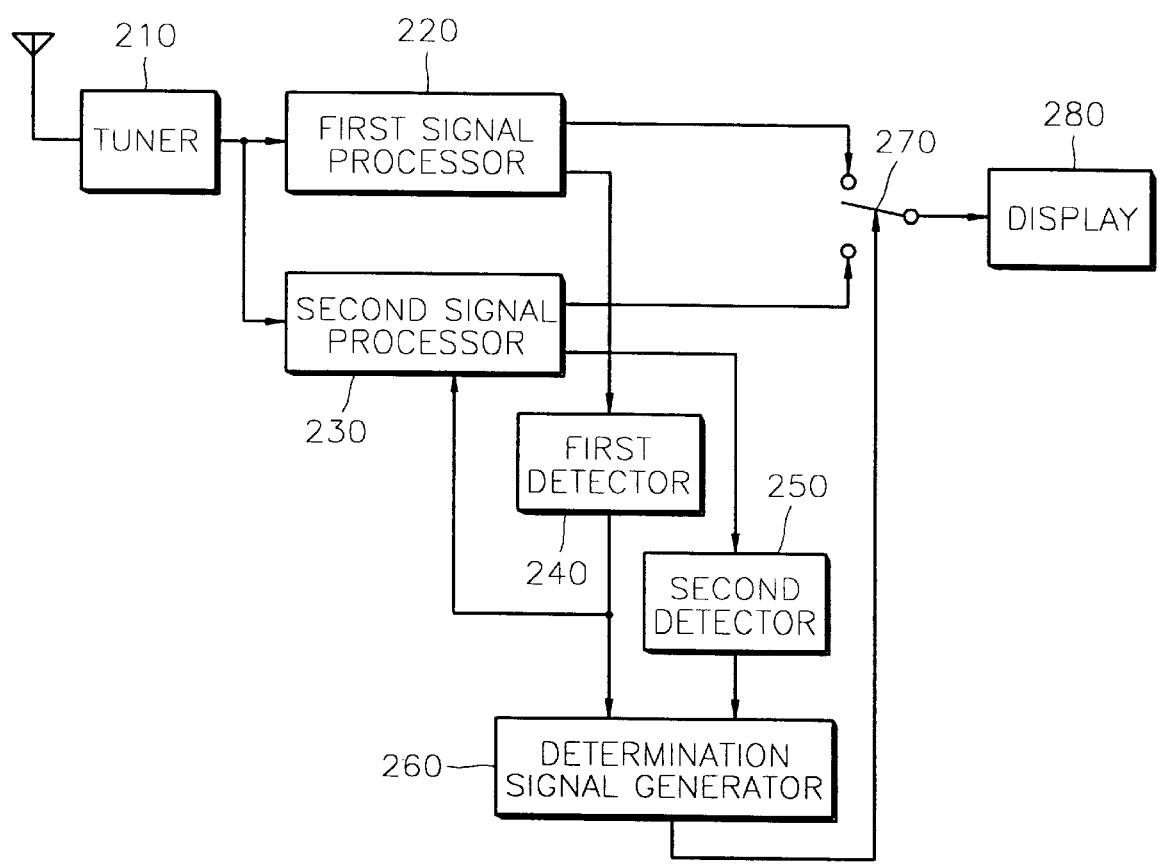
FIG. 2 is a block diagram of a simulcast receiver to which the present invention is applied.

Referring to FIG. 2, a simulcast receiver for receiving either an HDTV signal or a signal of an existing analog broadcasting (NTSC TV) format is comprised of a tuner 210, a first signal processor 220 for processing the NTSC TV signal, a second signal processor 230 for processing the HDTV signal, and a display 280. In order to select either the HDTV or NTSC TV signals and display the selected signal on the single display 280, it must be determined whether a current received signal is an HDTV or NTSC TV signal. A determiner for performing this determination includes first and second detectors 240 and 250 and a determination signal generator 260. A selector 270 selects either an NTSC TV signal demodulated by the first signal processor 220 or an HDTV signal demodulated by the second signal processor 230, according to the determination signal.

The operation of the simulcast receiver shown in FIG. 2 will now be described in detail. The tuner 210 receives the HDTV and NTSC TV signals simultaneously. That is, the tuner of the present invention is structured to allow both the HDTV and NTSC TV signals to be received. The first signal processor 220 amplifies an NTSC IF signal output from the tuner 210, and demodulates the amplified NTSC IF signal to a base band signal. The second signal processor 230 amplifies a HD IF signal output from the tuner 210, and demodulates the amplified HD IF signal to a base band signal.

The first detector 240 detects a synchronous signal from the NTSC TV signal output from the first signal processor 220 or, if a ghost cancellation reference (GCR) signal for removing the ghost exists during a vertical blanking period, detects the GCR signal, and then outputs a first detection signal indicating whether an NTSC TV signal exists.

The ghosting phenomenon, i.e., a shadow image shown on the TV screen, occurs when the electromagnetic waves from a broadcasting station are reflected by a mountain, a building, etc. In order to remove ghosting, the broadcasting station transmits a predetermined reference signal, i.e., a GCR signal, to allow the receiver to recognize the characteristics of a transmission channel, and the receiver recognizes the ghosting characteristics of the channel using the transmitted reference signal and filters a transmitted video signal. A device for removing the GCR signal and the ghosting is disclosed in U.S. Pat. No. 5,389,977, by the same applicant.

The second detector 250 detects a field or segment synchronous signal of the HDTV signal output from the second signal processor 230 and outputs a second detection signal. The determination signal generator 260 determines the first and second detection signals, output from the first and second detectors 240 and 250, to generate a determination signal. The selector 270 selects the output of the second signal processor 230 if the current received signal is an HDTV signal, and the output of the first signal processor 220 if the current received signal is an NTSC TV signal, according to the determination signal. Then, the selected signal is displayed on the display 280.

Figure 3:
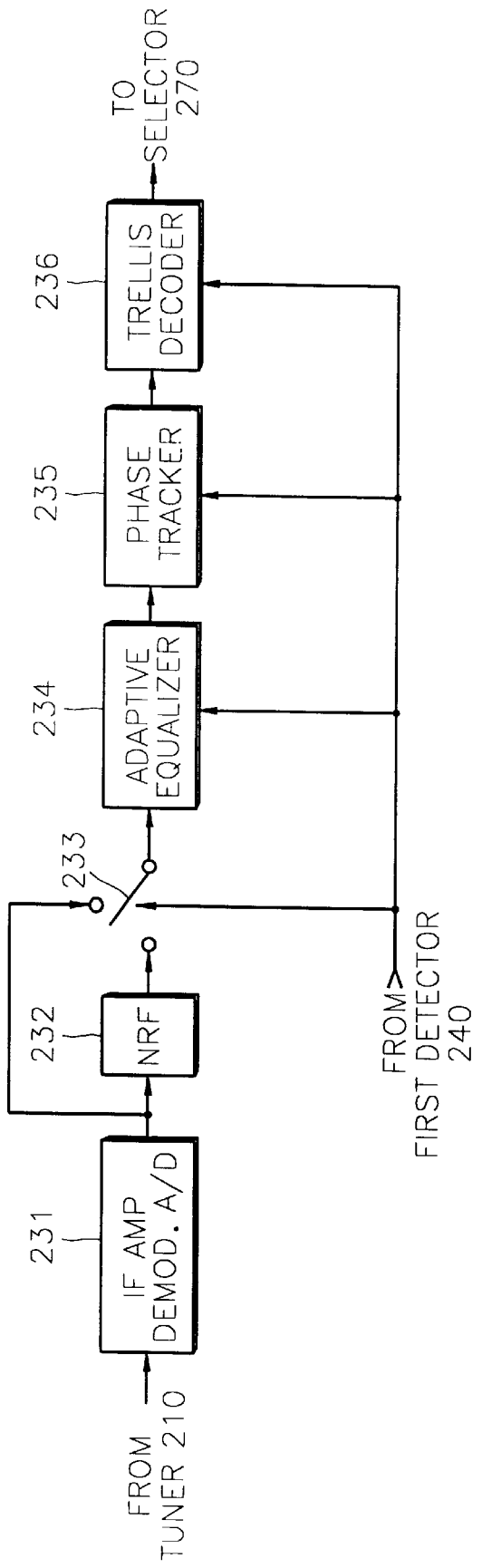
FIG. 3 is a block diagram of a second signal processor shown in FIG. 2, including the co-channel interference canceler.

FIG. 3 is a detailed block diagram of the second signal processor 230 shown in FIG. 2. Referring to FIG. 3, a block 231 adjusts the amplitude of an IF signal output from the tuner 210 shown in FIG. 2, demodulates the IF signal to a base band signal using a pilot signal included in the IF signal, and converts the demodulated signal into digital data.

The NRF 232 removes an NTSC component from the output of the block 231 to prevent degradation of the HDTV signal due to the NTSC signal. Here, the NRF 232 can be constituted of a combfilter disclosed by an ATSC standard and in the aforementioned U.S. Pat. No. 5,594,496, or can also be of various forms such as an FIR filter, a notch filter disclosed in the aforementioned U.S. Pat. No. 5,325,188, etc.

The selector 233 selects either the output of the NRF 232 or the output of the block 231 which has not passed through the NRF 232, according to the first detection signal output by the first detector 240 shown in FIG. 2. The adaptive equalizer 234 removes multipath distortion (also called ghosting) generated while a transmitted signal passes through a transmission channel. The phase tracker 235 removes phase noise, i.e., phase error, of an equalized signal output from the adaptive equalizer 233. The trellis decoder 236 trellis-decodes the output of the phase tracker 235.

Here, the adaptive equalizer 234, the phase tracker 235 and the trellis decoder 236 operate suitably according to the state of the signal selected by the selector 233.

If interference (e.g., ghosting, phase noise, etc.) other than co-channel interference are included in an input signal, they affect the selection of the NRF 232. Even if these signals can be removed, the conventional co-channel interference detection method may not generate a reliable result according to channel circumstances. Distortion due to the switching operation of the selector 233 enormously affects the performance of the receiver according to the result of detection of the co-channel interference. Thus, an accurate determination of whether the co-channel interference exists is required.

In determining whether the NTSC TV signal exists or not, the easiest and safest method is to detect whether a synchronous signal exists or not. The synchronous signal is detected even when multipath distortion or phase noise exists, so that the NTSC TV signal is detected as desired. Also, the presence or absence of the NTSC TV signal can be determined by searching for signals used as reference signals including the NTSC TV signal. For example, the presence or absence of the NTSC TV signal is determined by searching for a GCR signal which is a reference signal used for removing the ghosting.

Therefore, in the present invention, the presence or absence of co-channel interference is determined by detecting a synchronous or reference signal which is generated by NTSC TV signal processing in the first detector 240. Selection of the NRF 232 is determined as described above.

According to the present invention, in a simulcast receiver, control of selection of the NRF used to remove or reduce co-channel interference is made by detecting a synchronous or reference signal of the NTSC TV signal which is easily detected even in a poor environment, so that an accurate determination of whether co-channel interference exists is made regardless of the channel environment. Thus, selection error due to inaccuracy of the determination can be prevented, thus increasing reliability of the NRF selection control.

What is claimed is:

1. A co-channel interference canceler in a simulcast receiver for receiving a high definition television (HDTV) signal having a digital format and an analog broadcasting TV signal, comprising:
   a detector for detecting a synchronous signal from said analog broadcasting TV signal, determining whether or not the analog TV signal is received based on whether or not the synchronous signal is detected, and outputting a detection signal indicating whether or not the analog TV signal is received;
   a co-channel interference rejection filter for removing co-channel interference from a first input signal including co-channel interference and outputting a second input signal; and
   a selector for selecting either the first or second input signal according to said detection signal.

2. A co-channel interference canceler in a simulcast receiver for receiving a high definition television (HDTV) signal having a digital format and an analog broadcasting TV signal, comprising:
   a detector for detecting a reference signal from said analog broadcasting TV signal, determining whether or not the analog TV signal is received based on whether or not the reference signal is detected, and outputting a detection signal indicating whether or not the analog TV signal is received;
   a co-channel interference rejection filter for removing co-channel interference from a first input signal including co-channel interference and outputting a second input signal; and
   a selector for selecting either the first or second input signal according to said detection signal.

3. The co-channel interference canceler as claimed in claim 2, wherein said reference signal is a ghost cancellation reference (GCR) signal.

4. A method of removing co-channel interference for use in a simulcast receiver for receiving a high definition television (HDTV) signal having a digital format and an analog broadcasting TV signal, said method comprising the steps of:
   (a) detecting a synchronous signal from said analog broadcasting TV signal, determining whether or not the analog TV signal is received based on whether or not the synchronous signal is detected, and outputting a detection signal indicating whether or not the analog TV signal is received;
   (b) canceling co-channel interference from a first input signal including co-channel interference and other interference and outputting a second input signal; and
   (c) selecting either the first or second input signal according to said detection signal.

5. A method of removing co-channel interference for use in a simulcast receiver for receiving a high definition television (HDTV) signal having a digital format and an analog broadcasting TV signal, said method comprising the steps of:
   (a) detecting a reference signal from said analog broadcasting TV signal, determining whether or not the analog TV signal is received based on whether or not the reference signal is detected, and outputting a detection signal indicating whether or not the analog TV signal is received;
   (b) canceling co-channel interference from a first input signal including co-channel interference and outputting a second input signal; and
   (c) selecting either the first or second input signal according to said detection signal.

6. The method of removing co-channel interference as claimed in claim 5, wherein said reference signal is a ghost cancellation reference (GCR) signal.

7. A co-channel interference canceler in a simulcast receiver, comprising:
   a tuner for receiving a high definition television (HDTV) signal having a digital format and an analog broadcasting TV signal;
   a first signal processor for demodulating the analog broadcasting TV signal and outputting a first demodulated signal;
   a second signal processor for demodulating the HDTV signal and outputting a second demodulated signal, said second signal processor including a co-channel interference rejection filter for removing co-channel interference from the HDTV signal;
   a first detector for detecting a synchronous signal from the first demodulated signal and outputting a first detection signal;
   a second detector for detecting a field or segment synchronous signal from the second demodulated signal and outputting a second detection signal;
   a determination signal generator for detecting the first detection signal and the second detection signal and generating a determination signal; and
   a selector for selecting either the first demodulated signal or the second demodulated signal according to the determination signal.

8. A simulcast receiver, comprising:
   a first signal processor operable to process an analog signal and to output a processed analog signal;
   a second signal processor operable to process a digital signal and to output a processed digital signal;
   a first detector operable to detect, using a control signal output by said first processor, whether or not the analog signal is being received and to output a first detection signal indicating whether or not the analog signal is being received;
   a co-channel interference rejection filter, included within said second processor, operable to remove co-channel interference from a first input signal which includes the co-channel interference, and to output a second input signal; and
   a selector operable to select either the first input signal or the second input signal according to the detection signal.

9. The simulcast receiver of claim 8, further comprising:
   a second detector operable to detect, from a control signal output by said second processor, whether or not the digital signal is being received and to output a second detection signal indicating whether or not the digital signal is being received;
   a determination signal generator for detecting the first detection signal and the second detection signal and generating a determination signal; and
   a selector for selecting either the processed analog signal output by the first signal processor or the processed digital signal output by said second signal processor according to the determination signal.

10. A simulcast receiver according to claim 8, wherein said first detector detects whether or not the analog signal is being received based on whether or not a synchronous signal is present in the control signal output by said first processor.

11. A simulcast receiver according to claim 8, wherein said first detector detects whether or not the analog signal is being received based on whether or not a reference signal is present in the control signal output by said first processor.

* * * * *